(12) United States Patent
Okada et al.

(10) Patent No.: US 11,247,169 B2
(45) Date of Patent: Feb. 15, 2022

(54) COMBUSTION SYSTEM

(71) Applicant: Renaissance Energy Research Corporation, Kyoto (JP)

(72) Inventors: Osamu Okada, Kyoto (JP); Nobuaki Hanai, Kyoto (JP); Peng Yan, Kyoto (JP); Hideaki Matsuo, Kyoto (JP)

(73) Assignee: RENAISSANCE ENERGY RESEARCH CORPORATION, Kyoto (JP)

(*) Notice: Subject to any disclaimer, the term of this patent is extended or adjusted under 35 U.S.C. 154(b) by 0 days.

(21) Appl. No.: 17/071,186

(22) Filed: Oct. 15, 2020

(65) Prior Publication Data

US 2021/0023499 A1    Jan. 28, 2021

Related U.S. Application Data

(63) Continuation of application No. 16/078,620, filed as application No. PCT/JP2017/005881 on Feb. 17, 2017, now abandoned.

(30) Foreign Application Priority Data

Mar. 9, 2016 (WO) .................. PCT/JP2016/057453

(51) Int. Cl.
    *B01D 53/22*    (2006.01)
    *B01D 69/00*    (2006.01)
    (Continued)

(52) U.S. Cl.
    CPC .......... *B01D 53/22* (2013.01); *B01D 53/268* (2013.01); *B01D 69/00* (2013.01); *B01D 69/08* (2013.01);
    (Continued)

(58) Field of Classification Search
    None
    See application file for complete search history.

(56) References Cited

U.S. PATENT DOCUMENTS

| 2003/0012993 A1 | 1/2003 | Katagiri et al. |
| 2011/0023497 A1 | 2/2011 | Assmann |

(Continued)

FOREIGN PATENT DOCUMENTS

| EP | 2239048 B1 | 12/2014 |
| JP | 2002275482 A | 9/2002 |

(Continued)

OTHER PUBLICATIONS

Quinn, R., "New facilitated transport membranes for the separation of carbon dioxide from hydrogen and methane", Journal of Membrane Science, 104, 1995, pp. 139-146. (Year: 1995).*

(Continued)

*Primary Examiner* — Jason M Greene
(74) *Attorney, Agent, or Firm* — Haynes Beffel & Wolfeld LLP

(57) ABSTRACT

A biogas combustion system that obtains a stable output and saves energy is realized. A combustion system comprises a separation portion 14 that removes carbon dioxide from a treatment target gas containing a mixture gas containing methane as a main component and containing carbon dioxide to obtain methane gas of a high purity in which at least a content of carbon dioxide has been reduced, and a combustion portion 15 that combusts the methane gas. The separation portion 14 includes a first treatment chamber 11 and a second treatment chamber 12 separated from each other by a separation membrane 13 therebetween. The separation membrane 13 selectively allows the carbon dioxide in the treatment target gas supplied to the first treatment chamber 11 to pass therethrough to the second treatment chamber 12 to obtain a first separation gas having a higher (Continued)

methane purity than the treatment target gas in the first treatment chamber 11 and a second separation gas containing the carbon dioxide in the treatment target gas in the second treatment chamber 12.

13 Claims, 7 Drawing Sheets

(51) Int. Cl.
*F23K 5/00* (2006.01)
*B01D 53/26* (2006.01)
*B01D 69/08* (2006.01)
*B01D 69/10* (2006.01)

(52) U.S. Cl.
CPC .......... *B01D 69/10* (2013.01); *F23K 5/00* (2013.01); *F23K 5/007* (2013.01); *B01D 2257/504* (2013.01); *B01D 2325/20* (2013.01); *Y02C 20/40* (2020.08); *Y02E 50/30* (2013.01)

(56) References Cited

U.S. PATENT DOCUMENTS

| | | |
|---|---|---|
| 2013/0098242 A1 | 4/2013 | Ungerank et al. |
| 2014/0102297 A1 | 4/2014 | Hamad et al. |
| 2014/0290479 A1 | 10/2014 | Okada et al. |
| 2014/0352540 A1 | 12/2014 | Okada et al. |
| 2015/0060370 A1 | 3/2015 | Martin |
| 2016/0329580 A1 | 11/2016 | Kakuwa et al. |

FOREIGN PATENT DOCUMENTS

| | | | |
|---|---|---|---|
| JP | 2008-36464 A | 2/2008 | |
| JP | 2010209706 A | 9/2010 | |
| JP | 2011159485 A | 8/2011 | |
| JP | 2012013011 A | 1/2012 | |
| JP | 2012242011 A | 12/2012 | |
| JP | 2013022581 A | 2/2013 | |
| JP | 201349048 A | 3/2013 | |
| JP | 2013095727 A | 5/2013 | |
| JP | 2013107076 A | 6/2013 | |
| JP | 2013163984 A | 8/2013 | |
| JP | 2013534863 A | 9/2013 | |
| JP | 2014-91766 * | 5/2014 | ............ B01D 53/22 |
| JP | 2014091766 A | 5/2014 | |
| JP | 2015536814 A | 12/2015 | |
| JP | 2016000402 A | 1/2016 | |
| WO | 2012086836 A1 | 6/2012 | |

OTHER PUBLICATIONS

EP Search Report from Application No. 17762862.5 dated Nov. 7, 2019, 10 pages.
Quinn, et al., "New facilitated transport membranes for the separation of carbon dioxide from hydrogen and methane," J. of Membrane Science 104, Aug. 1995, 8 pages.
Sellaro et al., "CO2-CH4 Membrane Separation," La Chimica E. L'Industria, Oct. 31, 2015, 4 pages.
Yegani et al., "Selective separation of CO2 by using novel facilitated transport membrane at elevated temperatures and pressures," J. of Membrane Science 291, Mar. 1, 2017, 8 pages.

* cited by examiner

Fig. 7

| Evaluation condition | Evaluation condition 1 | Evaluation condition 2 | Evaluation condition 3 |
|---|---|---|---|
| Temperature (°C) | 110 | 110 | 110 |
| Supply side pressure (KPa (A)) | 900 | 900 | 900 |
| Supply gas composition (dry-base) | $CO_2:N_2 = 4:6$ | $CO_2:N_2 = 4:6$ | $CO_2:N_2 = 4:6$ |
| Supply gas composition (wet-base) | $CO_2:N_2:H_2O = 37.4: 56.2: 6.4$ | $CO_2:N_2:H_2O = 36.2: 54.3: 9.5$ | $CO_2:N_2:H_2O = 34.9: 52.4: 12.7$ |
| Supply side humidity (%) | 40 | 60 | 80 |
| Permeation side pressure (KPa (A)) | 100 | 100 | 114 |
| Permeation side gas composition | $H_2O:Ar = 57.6:42.4$ | $H_2O:Ar = 85.9: 14.1$ | $H_2O$ 100% |
| Permeation side humidity (%) | 40 | 60 | 80 |
| $CO_2$ permeance ($mol/m^2 \cdot s \cdot kPa$) | $1.3 \times 10^{-5}$ | $2.8 \times 10^{-5}$ | $3.3 \times 10^{-5}$ |
| $N_2$ permeance ($mol/m^2 \cdot s \cdot kPa$) | Equal to or lower than the GC detection limit | $3.1 \times 10^{-8}$ | $3.8 \times 10^{-8}$ |

COMBUSTION SYSTEM

PRIORITY CLAIMS

This application is a continuation of U.S. application Ser. No. 16/078,620, filed 21 Aug. 2018, which is a U.S. national stage filing of PCT/JP2017/005881, filed 17 Feb. 2017 and claims priority to PCT/JP2016/057453, filed 9 Mar. 2016.

TECHNICAL FIELD

The present invention relates to a combustion system for obtaining energy by combusting a gas containing carbon dioxide and methane as a main component such as a biogas obtained by methane fermentation of organic matter such as biomass and organic waste.

BACKGROUND ART

In recent years, it has drawn attention to utilize, as a new energy source, a biogas obtained by methane fermentation of organic waste such as biomass and sewage sludge. The biogas is used as a substitute for fossil fuel, and is used for power generation, boiler, and the like.

Biogas generally contains about 40% of carbon dioxide in addition to methane, although the content varies depending on the production conditions (fermentation conditions) of the methane gas. The biogas also contains a very small amount of sulfur compounds such as siloxane and hydrogen sulfide, and this must be removed at the time of use.

For example, digested gases from sewage sludge treated in relatively large facilities contain sulfur compounds such as hydrogen sulfide ($H_2S$) and many impurities such as siloxane. Also, in the case of biogas obtained by methane fermentation of livestock excrement, food waste, and the like which is supposed for small facilities, there are various trace components (oil, trace elements: V, Pb, Cl, etc., ethane, propane, dienes, benzene, toluene, etc.) depending on difference in individual facilities and gas production conditions, and the amounts and concentrations thereof may be different. These trace impurities affect the performance and durability of gas engines.

In a biogas engine, carbon dioxide in the biogas causes decrease in output and thermal efficiency of the gas engine. Further, engine adjustment work is required depending on the content and degree of variation of the composition of the biogas.

The output and thermal efficiency of a biogas engine that uses a mixture gas of methane and carbon dioxide as a fuel greatly decreases as the carbon dioxide concentration increases. For example, when a mixture gas containing 40% of $CO_2$ is used, the engine output and thermal efficiency of the gas engine decreases 40% and 14%, respectively, as compared with a methane fuel of a purity of 100%. This means that only a 60 kW output will be obtained even with a 100 kW natural gas engine, and on the contrary, if a 100 kW output is required, a natural gas engine of about 170 kW is needed. As a result, since the facility cost of the engine is almost proportional to the output thereof, the facility cost increases by 70%. Also, since the thermal efficiency decreases by 14%, the fuel cost increases by about 16% as compared with a natural gas engine.

For this reason, both the initial cost and the running cost of an engine for biogas have been high cost.

Patent Document 1 describes a biogas power generation apparatus that controls the total number of gas engines to be driven and driving of a surplus gas combustion apparatus in accordance with the pressure with which a biogas is supplied to the engines.

Patent Document 2 describes a power generation method in which carbon dioxide in a digested gas obtained by methane fermentation of organic matter such as biomass and organic waste is absorbed and separated using an alkali absorbing liquid and methane gas of a high purity is supplied to an engine.

Patent Document 3 describes, regarding a gas engine using a gas whose property changes during operation, such as biogas, as a fuel, a control method of a gas engine of a premixing type in which engine misfire or combustion abnormality is prevented by correcting and controlling an air-fuel ratio when the temperature of an exhaust gas is not within a preset range.

Patent Document 4 and Patent Document 5 relate to combustion control of an engine using a mixture gas of biogas and city gas (natural gas) as a fuel, and decrease in output of the engine is suppressed such that a biogas, whose heat generation amount changes, can be stably combusted, by respectively adjusting the oxygen concentration in an exhaust gas in Patent Document 4 and adjusting the mixture ratio of the biogas in accordance with the temperature of an exhaust gas in Patent Document 5.

PRIOR ART DOCUMENTS

Patent Documents

Patent Document 1: Japanese Patent Application Publication NO. 2010-209706
Patent Document 2: Japanese Patent Application Publication NO. 2002-275482
Patent Document 3: Japanese Patent Application Publication NO. 2012-13011
Patent Document 4: Japanese Patent Application Publication NO. 2012-242011
Patent Document 5: Japanese Patent Application Publication NO. 2013-163984

SUMMARY OF THE INVENTION

Problems to be Solved by the Invention

As described above, the amount of generation and the components of biogas is not stable depending on the conditions (fermentation conditions) at the time of generation of methane gas. Therefore, when a biogas is used as a fuel, combustion becomes unstable and a stable output sometimes cannot be obtained.

In order to obtain a stable output, a mechanism for controlling and adjusting the engine in accordance with the increase in size of the engine and change in the gas composition is required, and this has led to increase in the cost of the engine. In addition, the engine adjustment work that is complicated and requires a long time have been a major burden/risk factor for users and manufacturers.

In order to solve the above problem, if a gas obtained by removing a carbon dioxide component from the biogas is supplied to the engine, the quality of the gas becomes closer to ordinary natural gas, and thus it can be considered that adjustment becomes no longer required and cost reduction becomes possible. However, existing chemical absorption method, high-pressure water absorption method, PSA, etc.

all require expensive large-scale equipment and energy, resulting in impairment of environmental merit of using biogas.

As an example, in the case of converting a sewage digested gas into methane gas of a high purity by the high-pressure water absorption method and using the methane gas as a fuel for natural gas vehicles etc., the cost of refining facilities for processing 660 Nm$^3$/h of digested gas is reported to be about 1.53 billion yen. Since the digested gas of 660 Nm$^3$/h corresponds to the rated fuel of a 2000 kW biogas engine, and the price of the 2000 kW biogas engine itself is currently about 400 million yen, $CO_2$ removal by the existing high-pressure water absorption method will make the cost of the engine about five times. In the high-pressure water absorption method, energy of about 1 kW is consumed per 1 Nm$^3$ of $CO_2$ in order to remove $CO_2$, and this energy consumption corresponds to about 15% of the energy obtained by combustion of methane of biogas. In this way, the energy required for $CO_2$ removal by an existing water absorption method cancels the efficiency improvement effect of the gas engine that the $CO_2$ removal has.

Therefore, it is an object of the present invention to, even in the case of using an engine that uses a gas containing methane as a main component and containing carbon dioxide such as a biogas as a fuel gas, provide a combustion system with which a stable output can be obtained without necessity of complicated engine adjustment work, which does not require a process that consumes a large energy for removing carbon dioxide, and thus with which the environmental merit of using biogas can be enjoyed.

Means for Solving the Problem

In order to achieve the above-described object, as a first feature, a combustion system according to the present invention comprises a separation portion that removes carbon dioxide from a treatment target gas containing a mixture gas containing methane as a main component and containing carbon dioxide to obtain methane gas of a high purity in which at least a content of carbon dioxide has been reduced, and a combustion portion that combusts the methane gas.

The separation portion includes a first treatment chamber and a second treatment chamber separated from each other by a separation membrane therebetween.

The separation membrane selectively allows the carbon dioxide in the treatment target gas supplied to the first treatment chamber to pass therethrough to the second treatment chamber to obtain a first separation gas having a higher methane purity than the treatment target gas in the first treatment chamber and a second separation gas containing the carbon dioxide in the treatment target gas in the second treatment chamber.

The combustion system according to the present invention having the first feature preferably further has a second feature in which the separation membrane is a facilitated transport membrane to which a carrier that selectively reacts with carbon dioxide is added.

The combustion system according to the present invention having the second feature preferably further has a third feature in which the combustion system comprises a water vapor supply portion that supplies water vapor to the first treatment chamber, and the mixture gas containing the water vapor supplied by the water vapor supply portion is supplied to the first treatment chamber as the treatment target gas.

The combustion system according to the present invention having the third feature preferably further has a fourth feature in which the water vapor supply portion supplies, to the first treatment chamber, water vapor generated by heating water by heat exchange with a high-temperature exhaust gas generated by a combustion of methane by the combustion portion.

The combustion system according to the present invention having the third feature or the fourth feature preferably further has a fifth feature in which the water vapor supply portion supplies water vapor contained in an exhaust gas generated by the combustion of methane by the combustion portion to the first treatment chamber.

The combustion system according to the present invention having any one of the third to fifth features preferably further has a sixth feature in which the combustion system comprises an exhaust gas supply portion that mixes the mixture gas with at least part of an exhaust gas containing carbon dioxide and water vapor generated by the combustion of methane by the combustion portion and supplies the mixture gas mixed with the at least part of the exhaust gas to the first treatment chamber as the treatment target gas.

The combustion system according to the present invention having any one of the third to sixth features preferably further has a seventh feature in which the combustion system comprises a water vapor removing portion that removes water vapor from the first separation gas and supplies the first separation gas from which water vapor has been removed to the combustion portion.

The combustion system according to the present invention having the seventh feature preferably further has an eighth feature in which the water vapor supply portion supplies the water vapor removed by the water vapor removing portion to the first treatment chamber.

The combustion system according to the present invention having any one of the second to eighth features preferably further has a ninth feature in which the combustion system comprises a sweep gas supply portion that supplies a sweep gas to the second treatment chamber.

The combustion system according to the present invention having the ninth feature preferably further has a tenth feature in which the sweep gas contains water vapor, and the water vapor supply portion supplies the water vapor contained in the sweep gas to the sweep gas supply portion.

The combustion system according to the present invention having the eighth feature preferably further has an eleventh feature in which the combustion system comprises a sweep gas supply portion that supplies a sweep gas containing water vapor to the second treatment chamber, and the sweep gas supply portion supplies the sweep gas containing the water vapor removed by the water vapor removing portion to the second treatment chamber.

The combustion system according to the present invention having any one of the ninth to eleventh features preferably further has a twelfth feature in which the sweep gas supply portion supplies, to the second treatment chamber, water vapor generated by heating water by heat exchange with a high-temperature exhaust gas generated by the combustion of methane by the combustion portion.

The combustion system according to the present invention having any one of the ninth to twelfth features preferably further has a thirteenth feature in which the sweep gas supply portion supplies water vapor contained in an exhaust gas generated by the combustion of methane by the combustion portion to the second treatment chamber.

Further, in the combustion system according to the present invention having any one of the ninth to thirteenth features, the mixture gas may be preferably a gas derived from a biogas generated by methane fermentation of organic matter. Furthermore, preferably, in the case where the separation membrane is a facilitated transport membrane to which a carrier that selectively reacts with carbon dioxide is added, the combustion system comprises a desulfurization apparatus including a super-high desulfurization catalyst to remove a sulfur component contained in the gas derived from the biogas.

Effect of the Invention

The combustion system of the present invention has a configuration in which the separation membrane is used to remove carbon dioxide contained in the biogas or the like and to supply methane gas of a high purity to a combustion chamber. Thus, even in the case of using an engine using a gas containing methane as a main component and containing carbon dioxide such as biogas as a fuel gas, it is possible to obtain a stable output without requiring a complicated engine adjustment work. Here, as the separation membrane for removing carbon dioxide, a facilitated transport membrane to which a carrier that selectively reacts with carbon dioxide is added can be suitably used. Furthermore, the removed carbon dioxide can be recovered and reused for various industrial applications.

Removal of carbon dioxide by permeation through the above separation membrane (facilitated transport membrane) requires a large membrane area to obtain a separation gas of a high purity, but requires less energy than a process that consumes large energy for removal of carbon dioxide such as the high pressure water absorption method, and thus can maximize the environmental merit of using a biogas.

Engines that uses a gas containing methane gas as a main component and containing carbon dioxide as a fuel gas include, for example, as disclosed in Patent Documents 3 to 5, engines that detect a combustion state in a combustion chamber by a method such as measuring the temperature of exhaust gas and control the air-fuel ratio or the mixture ratio of the fuel gas on the basis of the combustion state, and engines that detect the combustibility (methane purity) of the fuel gas and perform control of increasing the pressure of the fuel gas in accordance with the combustibility and supplying the fuel gas to the combustion chamber. However, according to the combustion system of the present invention, as a result of removing carbon dioxide by using a separation membrane, such complicated control is not required and a sensor for detecting the combustion state or the combustibility of the fuel gas is neither required. Therefore, a low cost engine with a simple configuration can be used. A general-purpose inexpensive natural gas engine can be used.

Meanwhile, in the case of using a facilitated transport membrane, the presence of moisture is indispensable for obtaining a high permeation rate. Therefore, by allowing a gas obtained by mixing a water vapor gas with a biogas to pass through the facilitated transport membrane, carbon dioxide gas can be allowed to pass through with high selectivity even in a high temperature environment. As a result, the water vapor gas is mixed in the separation gas, but the water vapor gas is easily removed by cooling or using another selectively permeable membrane.

Further, the water vapor to be mixed with the biogas can also be separated from a mixture gas of water vapor and carbon dioxide discharged by combustion of methane gas and be reused. Further, it is also possible to recover and reuse the carbon dioxide contained in the exhaust gas via the separation membrane, and it is possible to reduce the environmental burden by not discharging carbon dioxide to the external environment.

BRIEF DESCRIPTION OF THE DRAWINGS

FIG. 7 is a table showing conditions with which membrane performance of a separation membrane is evaluated and evaluation results thereof.

DESCRIPTION OF EMBODIMENT

Embodiments of the present invention will be described in detail below.

Figure 1:
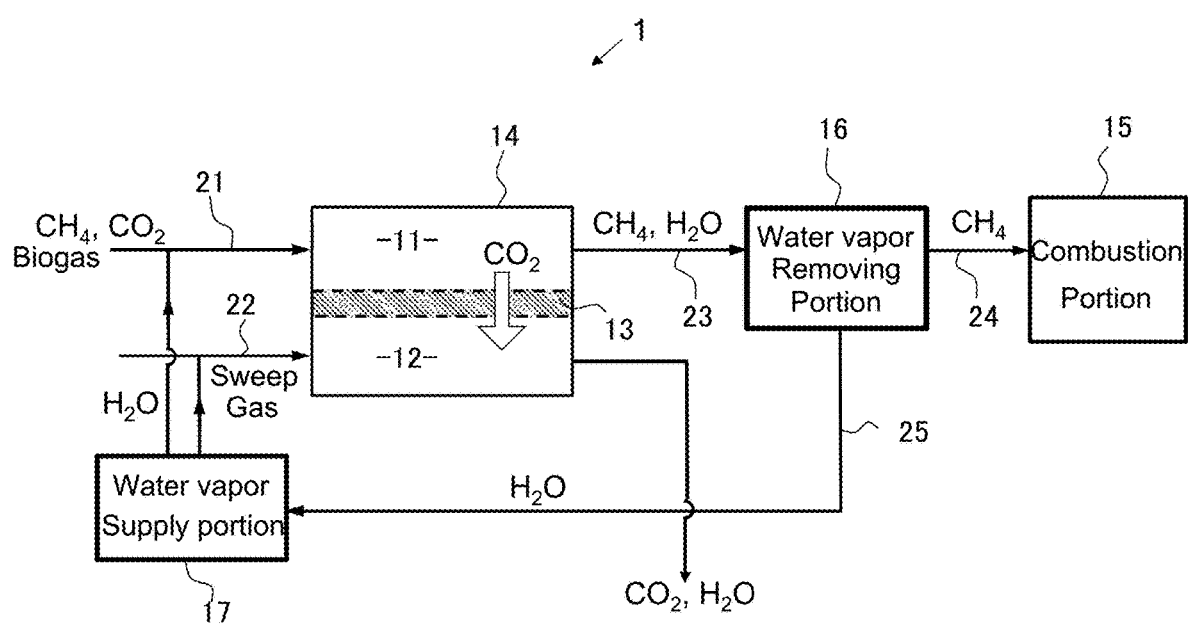
FIG. 1 is a schematic diagram showing a configuration of a main part of a combustion system according to an embodiment of the present invention.

FIG. 1 is a schematic diagram showing a configuration of a main part of a combustion system 1 according to an embodiment of the present invention. An arrow in FIG. 1 indicates a flow path and direction in which a gas flows in a simplified manner, and chemical formulae shown in FIG. 1 indicate main components included in the gas conceptually flowing in the arrow direction in the figure. Description of 3-way valves, mixing valves, etc. required in the gas flow path is omitted. The same applies to configuration diagrams of main parts of the combustion system to be described later. In addition, in each main part configuration diagram, the same constituent elements are denoted by the same reference symbols, and description thereof may be omitted in some cases.

The combustion system 1 includes a separation portion 14 and a combustion portion 15. The separation portion 14 removes carbon dioxide from a treatment target gas containing, as a component, a mixture gas containing methane as a main component and containing carbon dioxide, and separates methane gas of a high purity having at least a reduced content of carbon dioxide from the treatment target gas. Then, the combustion portion 15 combusts the methane gas of a high purity obtained by the separation portion 14. The combustion portion 15 is, for example, a combustion chamber of a gas engine or a gas turbine and is provided to convert thermal energy resulting from a combustion reaction of methane gas into energy such as kinetic energy or electric power.

The separation portion 14 has two treatment chambers 11 and 12 separated by a separation membrane 13. A mixture gas containing a component derived from biogas is supplied as a treatment target gas to the treatment chamber 11 (first treatment chamber) via a gas flow path 21. Although the mixture gas is a gas containing methane gas as a main component and containing carbon dioxide, impurities such as hydrogen sulfide and siloxane among components derived from biogas are removed in advance by using an existing desulfurization apparatus, a siloxane removal apparatus of an activated carbon adsorption system, etc.

As the desulfurization apparatus, a wet desulfurization method using an absorption liquid or an adsorption desulfurization method using a sulfur adsorption material such as zinc oxide or iron oxide can be used. Also, sulfur can be completely removed to the ppb level or less by using a copper zinc-based super high desulfurization catalyst. Particularly when using a facilitated transport membrane for the separation membrane 13, depending on the type of carrier used and the concentration thereof, the facilitated transport membrane may be influenced by hydrogen sulfide, so it is preferable to use a super-high desulfurization catalyst.

The separation membrane 13 has a function of selectively allowing carbon dioxide gas contained in the treatment target gas to pass through to the treatment chamber 12 (second treatment chamber) side with a permeability higher than the permeability of methane gas. As a result, the purity of carbon dioxide in the gas in the treatment chamber 11 decreases, and the purity of methane gas increases. In contrast, the purity of the carbon dioxide in the gas in the treatment chamber 12 increases.

Here, the purity of the gas refers to the molar concentration ratio of the gas component to the total gas (that is, equal to the ratio of the partial pressure of the gas). This also applies to the following description.

The separation membrane 13 is preferably composed of a facilitated transport membrane. The facilitated transport membrane is a membrane formed by adding a carrier that selectively reacts with a specific gas molecule (here, carbon dioxide), for example, in a gel membrane. The specific structure of the facilitated transport membrane will be described later.

In the $CO_2$ facilitated transport membrane described above, the permeation rate of $CO_2$ is facilitated because $CO_2$ permeates as a reaction product with the carrier in addition to physical permeation by the dissolution/diffusion mechanism. In contrast, gases such as $N_2$, $CH_4$, and $H_2$ that do not react with the carrier only permeates through the dissolution/diffusion mechanism, and therefore the separation factor of $CO_2$ to these gases is extremely large. The same applies to inert gases such as Ar and He, and, since these gases do not react with the carrier, the permeability thereof is extremely small compared with $CO_2$. Furthermore, since the energy generated during the reaction between $CO_2$ and carrier is used as energy for the carrier to release $CO_2$, there is no need to supply energy from the outside, which is essentially an energy saving process.

Here, "carrier" is substance having an effect of increasing the permeation rate of a specific gas when the substance is contained in a membrane.

Since the facilitated transport membrane not only has a high energy-saving effect and but also extremely compact, and a $CO_2$ separation/recovery process of much lower cost than existing chemical absorption methods and a further expensive pressure swing adsorption (PSA) method can be configured if the membrane can be mass produced, this membrane can be applied to recovery of $CO_2$ from power generation exhaust gas, iron-making exhaust gas, cement exhaust gas, etc. in addition to a decarbonation process, and further to a next-generation energy process such as a coal to liquids (CTL: production of liquid fuel from coal) field and to small chemical plants and facilities to which the existing decarbonation cannot be applied, and therefore $CO_2$ can be easily separated and recovered. Therefore, this membrane is expected to be a great contribution to a low-carbon society.

By the separation membrane 13, the treatment target gas containing methane gas and carbon dioxide gas is separated into a first separation gas in the treatment chamber 11, which is higher in purity of methane gas and lower in purity of carbon dioxide gas than the treatment target gas, and a second separation gas in the treatment chamber 12. The first separation gas is sent to the combustion portion 15 through a gas flow path 23, a water vapor removing portion 16, and a gas flow path 24, and the methane gas is used for combustion. Meanwhile, the second separation gas contains a large amount of carbon dioxide and can be recovered and reused for various industrial applications.

Meanwhile, in the case where the separation membrane 13 is a facilitated transport membrane and there is no moisture in the separation membrane 13, the permeation rate of carbon dioxide is generally very small, and therefore moisture in the membrane is indispensable for obtaining a high permeation rate. One method of keeping moisture in the separation membrane 13 is to constitute the gel layer with a highly water retentive hydrogel. This makes it possible to keep moisture in the membrane as much as possible even at a high temperature at which moisture in a separation function layer decreases, and it is possible to realize high selective permeation performance at a high temperature of, for example, 100° C. or higher. In addition, when the treatment target gas contains moisture (water vapor), it is preferable to supply the treatment target gas into the treatment chamber 11 while keeping the moisture without removing the moisture.

As another method of keeping the moisture in the separation membrane 13, preferably, a water vapor gas (steam) may be further mixed with a mixture gas containing methane gas and carbon dioxide gas, and the mixture gas containing water vapor may be introduced into the treatment chamber 11 as the treatment target gas. For this purpose, a water vapor supply portion 17 is provided in the combustion system 1. In the present embodiment, the water vapor gas supplied from the water vapor supply portion 17 is mixed with a mixture gas containing methane gas and carbon dioxide gas, and the mixture gas containing methane, carbon dioxide, and water vapor is supplied to the treatment chamber 11 of the separation portion 14 through the gas flow path 21.

The relative humidity of the treatment target gas containing water vapor is preferably 30% to 100% and more preferably 40% to 100%.

The treatment target gas containing water vapor may be pressurized and heated. By increasing the pressure, it is possible to increase the partial pressure difference of the carbon dioxide gas, which is the driving force of permeation, and to increase the permeation amount of carbon dioxide. In addition, increasing the partial pressure of steam by increasing the pressure also has an effect of increasing the relative humidity which is lowered by increasing the temperature. In view of the energy required for increasing the pressure, the pressure in the case of increasing the pressure is preferably 200 kPa (A) to 1000 kPa (A) and more preferably 400 kPa (A) to 1000 kPa (A). Although the temperature may be about room temperature, since the permeation performance of carbon dioxide tends to increase with temperature, the temperature is preferably 60° C. to 130° C. and more preferably from 80° C. to 120° C.

However, in the case of the configuration in which the water vapor supply portion 17 is provided as described above, the first separation gas is a gas containing methane gas and water vapor although the purity of carbon dioxide is low. When transferring the first separation gas to the combustion portion 15, it is preferable that the water vapor is removed.

Therefore, in the present embodiment, a water vapor removing portion 16 is provided between the treatment chamber 11 and the combustion chamber of the combustion portion 15, the water vapor removing portion 16 removes the water vapor mixed in by the water vapor supply portion 17 from the first separation gas, and the methane gas of a high purity from which the water vapor has been removed is supplied to the combustion portion 15. As the water vapor removing portion 16, a known configuration such as a configuration using a condenser or a configuration using a water vapor permeable membrane such as a perfluoro-based membrane (or a perfluorosulfonic acid-based membrane) can be used. For example, in the case of using a water vapor permeable membrane, since the water vapor gas is recovered in a gaseous state (in a state having latent heat) rather than in a cooled liquid state, at least a part of the removed water vapor gas can be returned as it is to the water vapor supply portion 17 to be reused as the water vapor gas to be mixed with the treatment target gas. As the water vapor permeable membrane, the facilitated transport membrane described above can also be used. In this case, the facilitated transport membrane may be made of a material different or the same material from or as that of the separation membrane 13. An example of a water vapor selective permeable membrane using a facilitated transport membrane is disclosed in WO 2012/014900.

The water vapor removed by the water vapor removing portion 16 can be supplied to the water vapor supply portion 17 via a gas flow path 25 to be added to the treatment target gas.

The method of supplying water vapor by the water vapor supply portion 17 is not limited to the method of utilizing the water vapor removed by the water vapor removing portion 16. Although it consumes additional energy, the water vapor may be generated by heating water. In this case, energy saving can be expected by using a high-temperature exhaust gas generated by combustion of methane in the combustion portion 15 to heat the water by heat exchange with the high-temperature exhaust gas to generate water vapor. As will be described later, it is also possible to reuse the water vapor contained in the exhaust gas after the combustion reaction of methane.

It is preferable to flow a sweep gas in the treatment chamber 12 in order to lower the partial pressure of the carbon dioxide on the permeation side to obtain the partial pressure difference serving as the driving force for selective permeation. The sweep gas is supplied from a gas flow path 22 (sweep gas supply portion). The sweep gas preferably contains water vapor gas. In the present embodiment, the water vapor supply portion 17 supplies the treatment target gas to which the water vapor is added to the treatment chamber 11, and also supplies the water vapor to the treatment chamber 12 such that the sweep gas contains water vapor. Regarding the water vapor contained in the sweep gas, energy saving can be expected by generating the water vapor by heating water by heat exchange with a high-temperature exhaust gas generated by combustion of methane similarly to the water vapor supplied to the treatment chamber 11. Further, as will be described later, it is also possible to reuse the water vapor contained in the exhaust gas after the combustion reaction of methane.

By supplying the water vapor gas serving as the sweep gas to the treatment chamber 12, it is possible to reduce the partial pressure difference of the water vapor gas between the supply side (the treatment chamber 11) and the permeation side (the treatment chamber 12), to reduce the permeation amount of the water vapor gas in the treatment target gas, and thus to suppress the decrease in the relative humidity of the treatment target gas. Further, as the recovery rate of $CO_2$ is higher, the proportion of the water vapor gas on the permeation side becomes smaller, so that the relative humidity of the gas (second separation gas) in the treatment chamber 12 becomes lower. However, the decrease in the relative humidity can be suppressed by increasing the flow rate of the water vapor gas contained in the sweep gas. However, in the case of using water vapor as a sweep gas, it is necessary to perform control such that the pressure on the permeation side is equal to or lower than the saturated vapor pressure at the temperature at which the water vapor is used. That is, when water vapor gas alone is used as the sweep gas under a temperature condition lower than 100° C., the permeation side needs to be depressurized.

In this way, by supplying the treatment target gas containing methane and carbon dioxide to the treatment chamber 11 and allowing the carbon dioxide in the treatment target gas to pass through the separation membrane 13 with a higher permeability than that of methane, methane gas of a high purity hardly containing carbon dioxide can be supplied to the combustion portion 15. As a result, by incorporating a gas engine as the combustion portion 15 of the combustion system 1, the gas engine can obtain a stable output without the need for complicated engine adjustment work even when biogas is used as the fuel, and miniaturization and increase in output can be expected.

In addition, since complicated and high-grade engine control such as control of the air-fuel ratio of the fuel gas according to the combustion state of the combustion chamber or pressurizing control of the supplied fuel gas according to the combustibility (methane purity) of the fuel gas is not necessary, a gas engine of a simpler configuration can be used, and therefore cost reduction can be expected. It becomes possible to use a general-purpose inexpensive natural gas engine.

Further, in the combustion system 1, by using the $CO_2$ selective permeable membrane, carbon dioxide can be removed without consuming large energy, which saves energy, and it is possible to enjoy the environmental merit of using biogas without impairing the merit.

Second Embodiment

FIGS. 2 to 6 schematically show other configuration examples of the combustion system of the present invention. Combustion systems 2 to 6 shown in FIGS. 2 to 6 enable reuse of the exhaust gas generated by the combustion reaction of methane in the combustion portion 15.

The combustion reaction of methane produces water vapor and carbon dioxide. By using the water vapor gas as a sweep gas to be supplied to the second treatment chamber 12 of the separation portion or mixing the water vapor gas with the treatment target gas, it becomes possible to keep moisture in the separation membrane even under a high temperature condition as described above and obtain a high permeability. Meanwhile, by removing the carbon dioxide gas by the separation membrane, the burden exerted on the environment by the exhaust gas can be reduced. Also, by increasing the purity, various industrial applications become possible.

Figure 2:
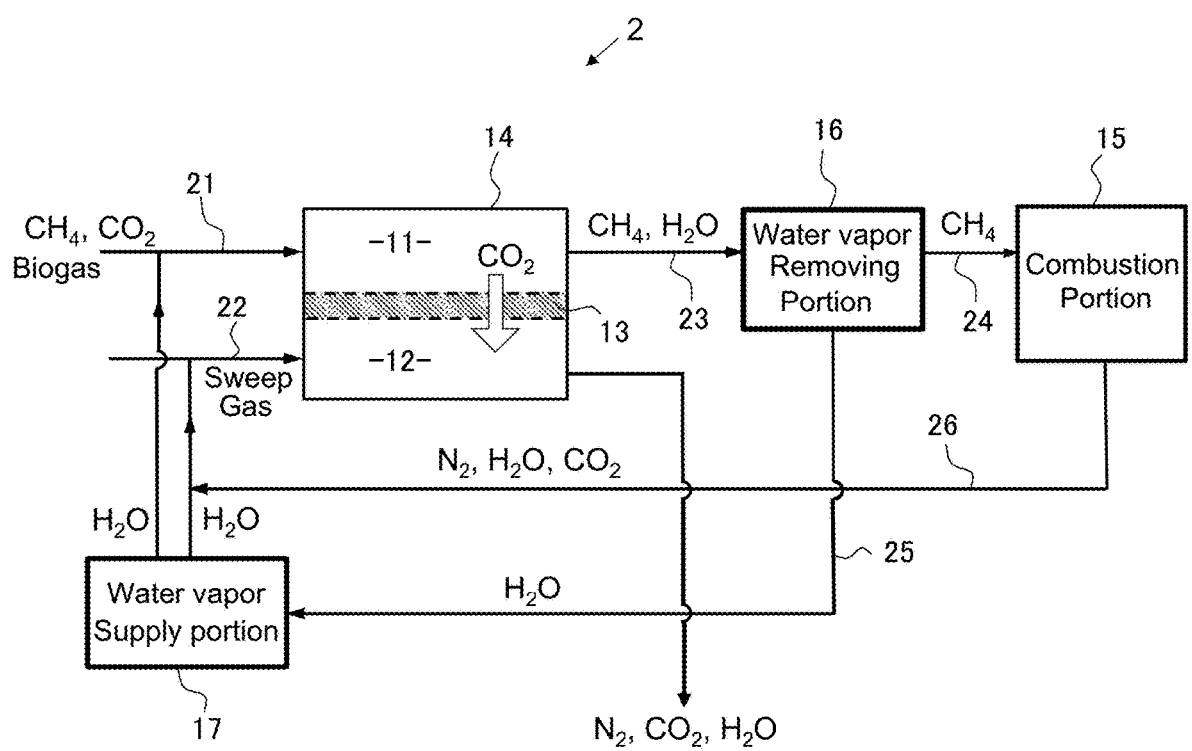
FIG. 2 is a schematic diagram showing a configuration of a main part of a combustion system according to an embodiment of the present invention.

In the combustion system 2 shown in FIG. 2, the exhaust gas generated in the combustion portion 15 is mixed with water vapor from the water vapor supply portion 17 and supplied as a sweep gas. Accordingly, the water vapor contained in the exhaust gas is effectively utilized. However, since the exhaust gas contains carbon dioxide, it is necessary to adjust the mixing ratio and flow rate of water vapor such that the partial pressure of carbon dioxide in the sweep gas does not exceed the partial pressure of carbon dioxide in the treatment target gas.

When it is assumed that the ratio of nitrogen and oxygen in the air is 4:1 and all oxygen in the air taken into the combustion chamber is used for combustion of methane without excess or deficiency, the composition of the exhaust gas after methane combustion is $CO_2:H_2O:N_2=1:2:8$. When the exhaust gas is used as a sweep gas for the facilitated transport membrane, it is necessary to supply a pressurized exhaust gas to the treatment chamber 12 in order to obtain the preferable relative humidity described above. However, the pressurization of the exhaust gas also increases the partial pressure of carbon dioxide contained in the exhaust gas, and there is a possibility that the driving force necessary for selective permeation of carbon dioxide decreases. For this reason, in general, water vapor is separately added to the sweep gas in order to obtain high selectivity when using the exhaust gas as a sweep gas for the facilitated transport membrane. However, since selective permeation membranes other than the facilitated transport membrane (for example, a $CO_2$ separation membrane utilizing a dissolution/diffusion mechanism) do not require moisture for membrane permeation, an effect as a sweep gas can be expected by just directly introducing the exhaust gas on the permeation side.

Figure 3:
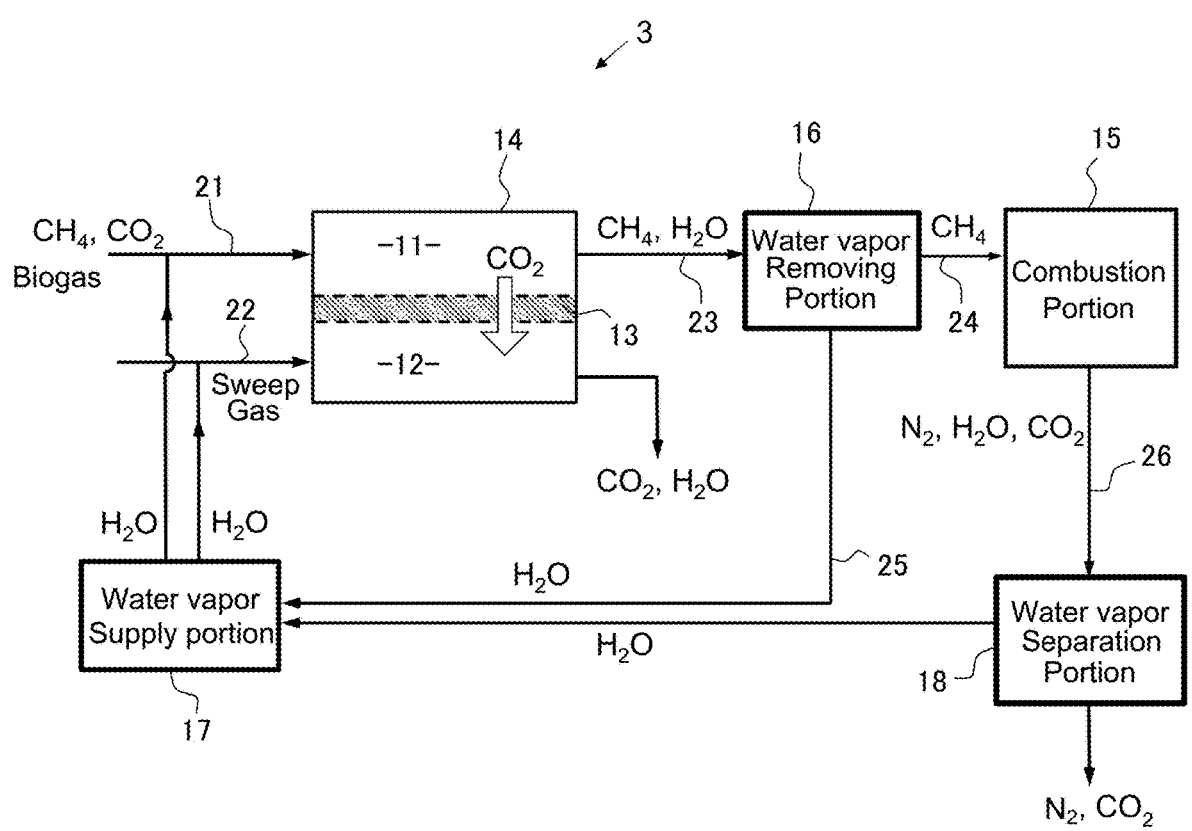
FIG. 3 is a schematic diagram showing a configuration of a main part of a combustion system according to an embodiment of the present invention.

In the combustion system 3 shown in FIG. 3, a water vapor separation portion 18 is provided in a flow path 26 through which the exhaust gas from the combustion portion flows. The water vapor separation portion 18 separates water vapor contained in the exhaust gas. The separated water vapor can be mixed with the sweep gas or the treatment target gas through the water vapor supply portion 17. Similarly to the water vapor removing portion 16, a known configuration including a water vapor permeable membrane can be used for the water vapor separation portion 18. Further, a facilitated transport membrane can also be used for the water vapor separation portion. Meanwhile, gas containing carbon dioxide and nitrogen remaining after the separation of the water vapor can also be used as the sweep gas to be supplied to the treatment chamber 12 similarly to the combustion system of FIG. 2 (although not illustrated).

Figure 4:
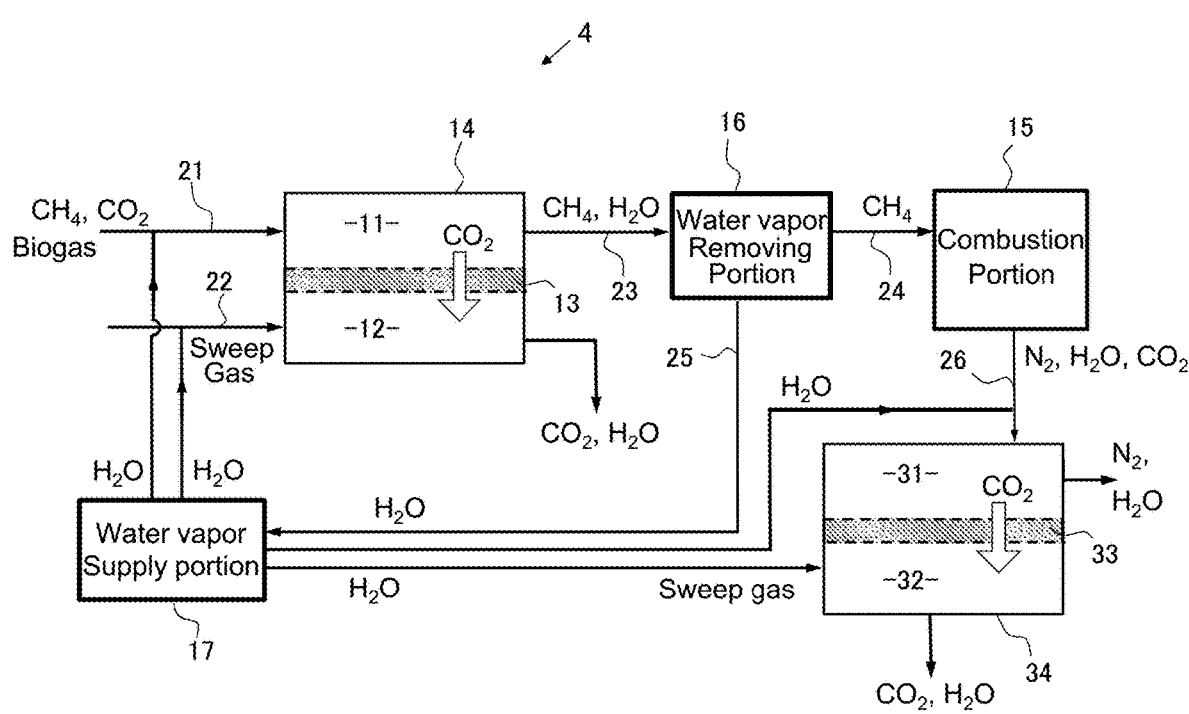
FIG. 4 is a schematic diagram showing a configuration of a main part of a combustion system according to an embodiment of the present invention.

In the combustion system 4 shown in FIG. 4, the exhaust gas from the combustion portion 15 flows into a treatment chamber (supply side) 31 of a separation portion 34 that is provided with a separation membrane 33 ($CO_2$ facilitated transport membrane) and different from the separation portion 14. Although components of the exhaust gas include nitrogen gas derived from taking in oxygen necessary for combustion from the air, by supplying the exhaust gas to the treatment chamber 31 of the separation portion 34, gas containing carbon dioxide and water vapor from which nitrogen has been removed can be obtained in a treatment chamber 32 on the permeation side. This gas can be used for various industrial applications as carbon dioxide gas of a high purity by removing a water vapor component. A sweep gas can flow into the treatment chamber 32. Water vapor is preferred as the sweep gas. The water vapor supply portion 17 can supply water vapor to be mixed with the exhaust gas in the treatment chamber 31 to obtain a high carbon dioxide permeation rate and water vapor to be supplied into the treatment chamber 32 as the sweep gas.

Figure 5:
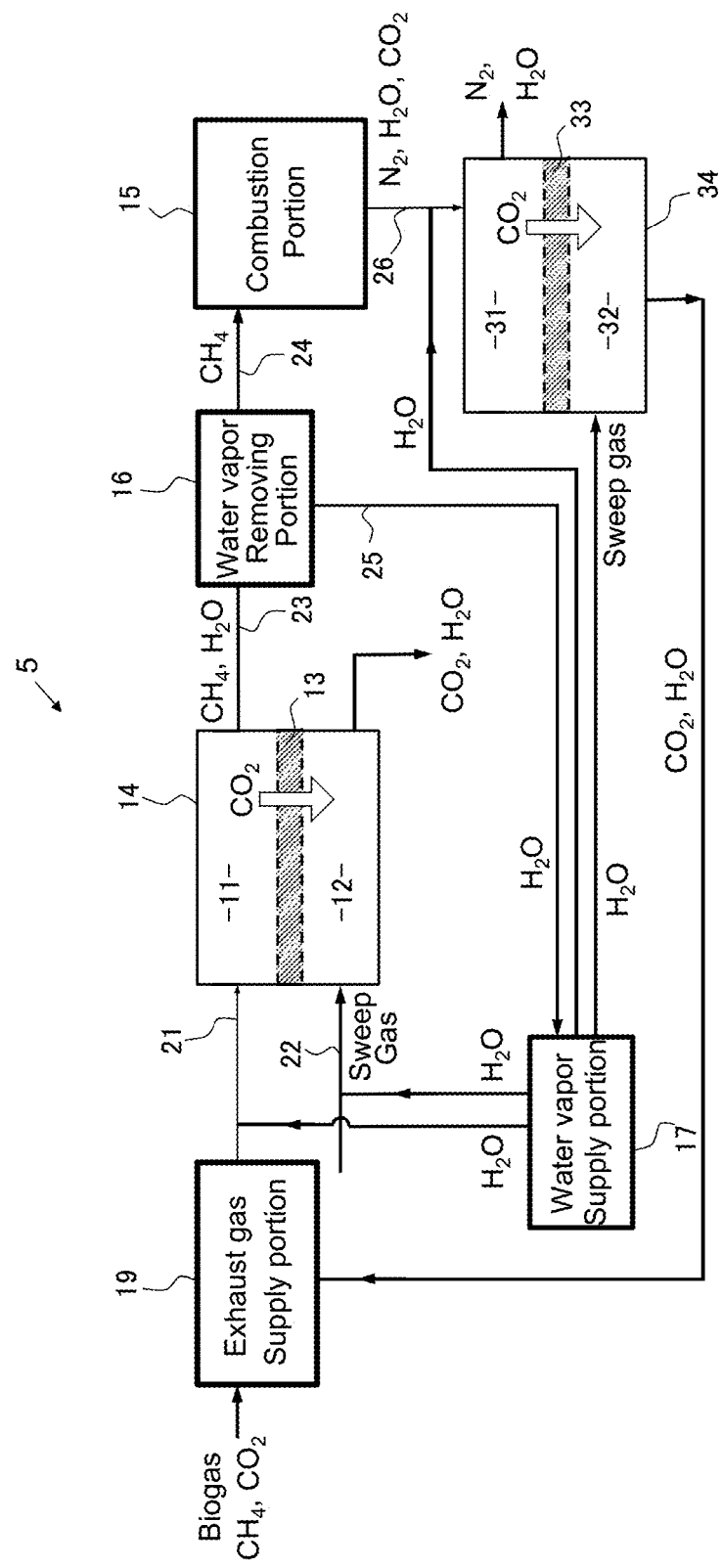
FIG. 5 is a schematic diagram showing a configuration of a main part of a combustion system according to an embodiment of the present invention.

The combustion system 5 shown in FIG. 5 is the same as the combustion system 4 of FIG. 4 in that the separation portion 34 for removing nitrogen in the exhaust gas is provided. The gas obtained by the nitrogen separation and containing carbon dioxide and water vapor is mixed with a biogas by an exhaust gas supply portion 19 and the mixture gas is supplied to the supply side (treatment chamber 11) of the separation portion 14 as the treatment target gas. As a result, carbon dioxide in the exhaust gas selectively permeates the separation membrane 33 of the separation portion 34, further selectively permeates the separation membrane 13 of the separation portion 14, and is recovered as the second separation gas in the treatment chamber 12. The recovered carbon dioxide gas can be used for various industrial applications as carbon dioxide gas of a high purity after removal of water vapor.

Figure 6:
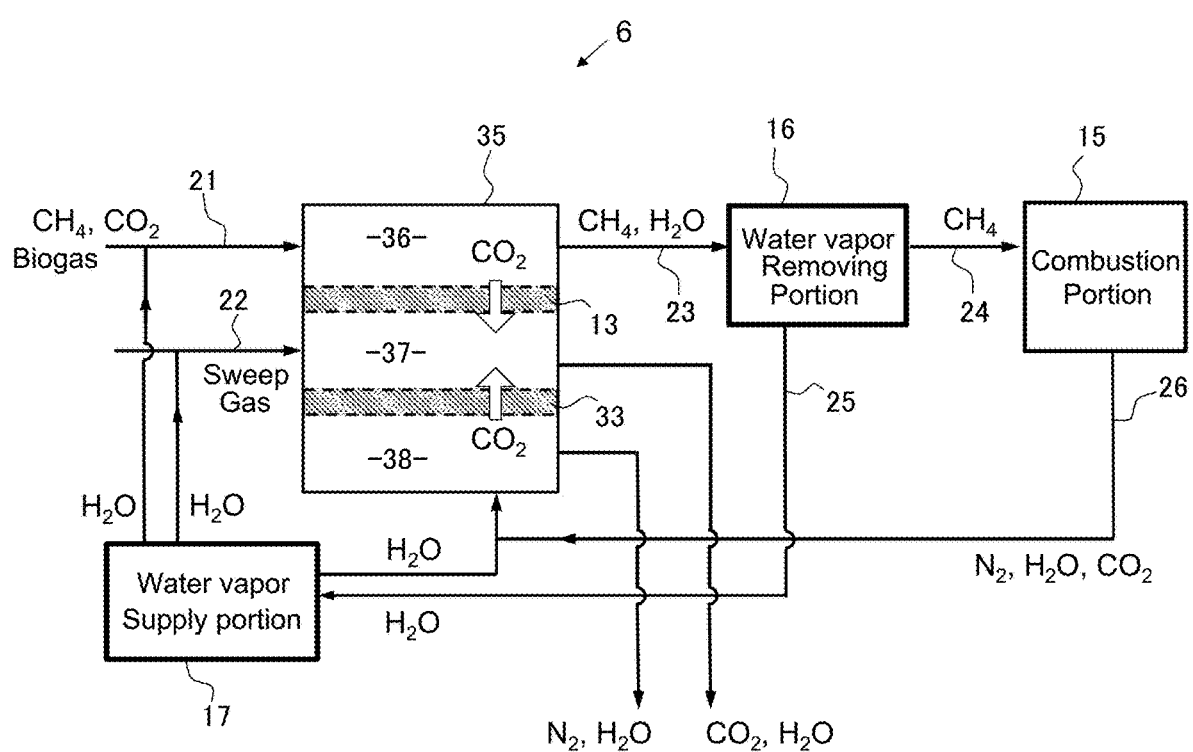
FIG. 6 is a schematic diagram showing a configuration of a main part of a combustion system according to an embodiment of the present invention.

The combustion system shown in FIG. 6 has a configuration in which the treatment chamber 12 of the separation portion 14 and the treatment chamber 32 of the separation portion 34, to both of which the sweep gas is supplied, in the configuration of FIG. 4 are integrated. In place of the separation portions 14 and 34, a separation portion 35 is provided. The separation portion 35 is divided into three treatment chambers by the separation membranes 13 and 33. A mixture gas of biogas and water vapor supplied from the water vapor supply portion 17 is supplied as the treatment target gas to a treatment chamber 36 separated by the separation membrane 13. A mixture gas obtained by mixing the water vapor supplied from the water vapor supply portion 17 with the exhaust gas after combustion of methane is supplied to a treatment chamber 38 separated by the separation membrane 33. A water vapor gas as a sweep gas is supplied to a treatment chamber 37 separated by both of the separation membrane 13 and the separation membrane 33, the carbon dioxide gas contained in the biogas is selectively allowed to pass through the separation membrane 13 from the treatment chamber 36 to the treatment chamber 37, and the carbon dioxide gas in the exhaust gas is selectively allowed to pass through the separation membrane 33 from the treatment chamber 38 to the treatment chamber 37. According to this configuration, both carbon dioxide in the exhaust gas and carbon dioxide in the biogas can be recovered in the treatment chamber 37 and reused as carbon dioxide gas of a high purity.

As described above, in the combustion system shown in FIGS. 2 to 6, the combustion portion 15 can reuse a water vapor gas or carbon dioxide gas in the exhaust gas generated by the combustion reaction of methane.

In particular, in the combustion systems shown in FIGS. 4 to 6, a configuration in which the carbon dioxide gas generated by combustion is recovered through the separation membrane 13 or 33 such that carbon dioxide is not discharged to the external environment can be employed, and the environmental burden can be reduced.

Hereinafter, the configuration and production method of the separation membrane 13 (33) will be specifically described.

<Membrane Structure>

The separation membranes 13 and 33 are $CO_2$ facilitated transport membranes, and as described above, have a structure in which carriers that selectively react with $CO_2$ are contained in a gel membrane. Examples of the $CO_2$ carrier include carbonates and bicarbonates of alkali metals such as cesium carbonate and cesium bicarbonate, and rubidium carbonate and rubidium bicarbonate. Likewise, hydroxides of alkali metals such as cesium hydroxide and rubidium hydroxide can be referred to as equivalents because these also react with carbon dioxide to produce carbonate and bicarbonate. In addition, amino acids such as 2,3-diaminopropionic acid salt (DAPA) and glycine are known to exhibit high $CO_2$ selective permeation performance.

More specifically, the $CO_2$ facilitated transport membrane may be formed by supporting a gel layer containing the carriers in the gel membrane with a hydrophilic or hydrophobic porous membrane. Examples of a membrane material constituting the gel membrane include polyvinyl alcohol (PVA) membranes, polyacrylic acid (PAA) membranes, and polyvinyl alcohol-polyacrylic acid (PVA/PAA) salt copolymer membranes. Here, the polyvinyl alcohol-polyacrylic acid salt copolymer may be sometimes referred to as a polyvinyl alcohol-polyacrylic acid copolymer by one skilled in the art.

It is known that the $CO_2$ facilitated transport membrane having the above-described configuration exhibits high $CO_2$ selective permeation performance.

However, such the permeation rate of carbon dioxide through such a $CO_2$ facilitated transport membrane is very small in the case where no moisture is in the membrane, and moisture in the membrane is indispensable for obtaining a high permeation rate. Therefore, it is preferable that the gel membrane is a hydrogel membrane. By constituting the gel membrane by a highly water retaining hydrogel membrane, it is possible to keep moisture in the membrane as much as possible even in an environment where moisture in the gel membrane is reduced (for example, at high temperature of 100° C. or higher), and high $CO_2$ permeance can be realized. In the above example, the polyvinyl alcohol-polyacrylic acid (PVA/PAA) salt copolymer membrane and the polyacrylic acid membrane are hydrogel membranes.

The hydrogel is a three-dimensional network structure formed by crosslinking a hydrophilic polymer by chemical crosslinking or physical crosslinking, and has a property of swelling by absorbing water.

Further, a catalyst for accelerating the reaction between the $CO_2$ carrier and $CO_2$ may be contained in the membrane. As such a catalyst, it is preferable to include carbonic anhydrase and an oxo acid compound, and it is particularly preferable to include an oxo acid compound of at least one element selected from Group 14 elements, Group 15 elements, and Group 16 elements. Alternatively, it is preferable that the catalyst contains at least one of a telluric acid compound, a selenious acid compound, an arsenious acid compound, and an orthosilicic acid compound.

In the present embodiment, the $CO_2$ facilitated transport membrane 13 (33) is composed of a gel membrane composed of a hydrogel containing carbon dioxide carriers and a porous membrane supporting the gel membrane. Incidentally, the membrane structure of the $CO_2$ facilitated transport membrane is not limited to this specific example. For example, a structure in which a gel membrane containing carriers is formed on the outer peripheral side surface or the inner peripheral side surface of a cylindrical porous support body may be employed.

<Membrane Production Method>

Hereinafter, a method of producing the $CO_2$ facilitated transport membrane (separation membranes 13 and 33) will be described.

First, a cast solution composed of an aqueous solution containing a PVA/PAA salt copolymer, a $CO_2$ carrier (here, $Cs_2CO_3$), and a $CO_2$ hydration reaction catalyst is prepared (Step 1). More specifically, 2 g of a polyvinyl alcohol-polyacrylic acid (PVA/PAA) salt copolymer (for example, SS gel manufactured by Sumitomo Seika Chemicals Co., Ltd.), 4.67 g of cesium carbonate, and 0.025 times of potassium tellurite with respect to the cesium carbonate in terms of molar number are added to 80 g of water and stirred until dissolved to obtain a cast solution. Next, the cast solution obtained in Step 1 is cast on a PTFE porous membrane with an applicator (Step 2). Thereafter, the cast solution is caused to gel by drying to form a gel layer (Step 3).

<Performance Evaluation Results>

Results of evaluation of selective permeability of carbon dioxide of the $CO_2$ facilitated transport membrane formed by the above-described production method are shown below.

The separation membrane 13 is obtained by using the above-described $Cs_2CO_3$ as the $CO_2$ carrier constituting the $CO_2$ facilitated transport membrane and by adding the $CO_2$ carrier to a hydrogel containing a PVA/PAA salt copolymer of a hydrogel membrane as a main component and by supporting the $CO_2$ carrier added membrane with a hydrophobic PTFE porous membrane.

In the evaluation results shown below, for the sake of convenience of the evaluation experiment, instead of evaluating the selective permeation performance of $CO_2$ with respect to $CH_4$, methane was substituted by nitrogen, and the selective permeation performance of $CO_2$ with respect to $N_2$ in a mixture gas containing nitrogen and carbon dioxide is evaluated. As described above, since $CH_4$ and $N_2$ do not react with carriers in the $CO_2$ facilitated transport membrane, the permeability thereof is extremely small as compared with that of $CO_2$. In fact, an experiment using a mixture gas containing three components of $CH_4$, $N_2$ and steam ($H_2O$) was conducted on the above-described separation membrane, and as a result, the ratio of $CH_4$ permeance to $N_2$ permeance was 0.74. Therefore, in the following simulation example, a value obtained by multiplying the $N_2$ permeance by 0.74 is adopted as the $CH_4$ permeance in the evaluation condition of the membrane.

Results of evaluation of the separation membrane 13 performed on the above-described membrane in three conditions in which the temperature and the pressure (total pressure) on the supply side (the treatment chamber 11 side) are kept constant and the relative humidity of the treatment target gas and the sweep gas is changed are shown.

First, the treatment target gas was a mixture gas containing nitrogen (instead of methane), carbon dioxide, and water vapor as described above. At this time, the treatment temperature and the total pressure of the treatment target gas were kept constant at 110° C. and 900 kPa, and the partial pressure of the water vapor gas to be supplied to the treatment chamber 11 was changed. Meanwhile, considering a general biogas composition ($CO_2$:$CH_4$=4:6), the partial pressures of nitrogen and carbon dioxide were respectively changed such that the composition ratio (partial pressure ratio) of carbon dioxide and nitrogen not considering water vapor maintained $CO_2$:$N_2$=4:6. The sweep gas is a water vapor gas or a mixture gas of water vapor and Ar, the partial pressure of the water vapor gas is set to be the same as that of the treatment target gas, and in the conditions 1 and 2, an Ar gas was added to the sweep gas such that the total pressure was 100 kPa (atmospheric pressure).

FIG. 7 shows the temperature, the pressure, composition ratio (partial pressure ratio), and relative humidity of the treatment target gas and sweep gas, and the evaluation results of the $CO_2$ permeance and the $N_2$ permeance under each evaluation condition. In an evaluation condition 1, the $N_2$ permeance being "equal to or lower than the GC detection limit" means that the concentration of $N_2$ in the second separation gas that has passed through the separation membrane 13 was too low to detect $N_2$ by gas chromatography to calculate the permeance thereof. In this case, the $N_2$ permeance is estimated to be at most $1.37 \times 10^{-8}$ [mol/m$^2$·s·kPa].

The selectivity of $CO_2$ over $N_2$ ($CH_4$) can be expressed as the ratio of $CO_2$ permeance over $N_2$ ($CH_4$) permeance. From FIG. 7, it can be seen that the $CO_2$ facilitated transport membrane has $CO_2/N_2$ selectivity larger than 500. Therefore, regarding $CO_2/CH_4$ selectivity, equivalent selective performance is achieved.

It is noteworthy that in the evaluation conditions 1 to 3, the higher the relative humidity is, the higher the $CO_2$ permeance is. Such humidity dependence is considered to be a feature of the facilitated transport membrane. The facilitated transport membrane has very high $CO_2$ permeance and selectivity, particularly in the high humidity region, as compared with other separation membranes (separation membrane of dissolution/diffusion mechanism, etc.).

<Required Membrane Area>

On the basis of the membrane performance evaluation results of the evaluation conditions 1 to 3 described above, a membrane area required for the methane concentration (purity) on the first separation gas exit side (near the gas flow path 23) to be 90% or higher was calculated, and the results thereof are shown. In the evaluation of the required membrane area, the composition of the treatment target gas, the composition of the sweep gas, and the membrane permeation performance of the evaluation conditions 1 to 3 described above were input in a simulator, and the minimum membrane area in which the methane concentration (purity) was 90% or higher was determined while changing the membrane area and the flow rate of the sweep gas. For $CH_4$ permeance, as described above, a value obtained by multiplying $N_2$ permeance by 0.74 was adopted. However, in the evaluation condition 1, since $N_2$ permeance is equal to or lower than the GC detection limit, a value obtained by multiplying $N_2$ permeance in the evaluation condition 3 by 0.74 was adopted as the $CH_4$ permeance in the evaluation condition 1 (therefore, actual $CH_4$ permeance is considered to be lower than this). The flow rate of the treatment target gas (excluding water vapor) to be supplied to the treatment chamber 11 was set to 330 $Nm^3/h$.

In addition, the $CO_2$ permeance was set to a constant value (value shown in FIG. 7) regardless of a region of the membrane. However, the facilitated transport membrane has a feature that the $CO_2$ permeance is higher when the $CO_2$ partial pressure difference between the supply side (the treatment chamber 11 side) and the permeation side (the treatment chamber 12 side) is lower (see, for example, JP 2015-223893). Therefore, in fact, the $CO_2$ permeance at a position closer to the exit side (near the flow path 23) of the membrane starting from the entrance side (near the flow path 21) of the membrane is higher due to the distribution of the $CO_2$ partial pressure on the membrane in the treatment chamber 11. Therefore, in the case of using a facilitated transport membrane, it is considered that the membrane area that is actually necessary can be smaller than the calculated value.

As a result of the calculation, the required membrane area was 575 $m^2$ in the case of the evaluation condition 1, and 250 $m^2$ in the case of the evaluation condition 3. Although this is relatively a large area, this is possible enough to realize as a combustion system for combusting biogas by combining a plurality of membrane modules.

Therefore, according to the combustion system of the present invention, by removing the carbon dioxide contained in the biogas via the $CO_2$ separation membrane and supplying the methane gas of a high purity after the removal to the combustion chamber, it is possible to realize a combustion system that can maximize the environmental merit of using the biogas, save energy, and obtain a stable output.

Other Embodiments

Other embodiments will be described below.

<1> In the combustion systems 1 to 6 of the above embodiment, the separation membranes ($CO_2$ facilitated transport membranes) 13 and 33 are flat membranes, but the present invention is not necessarily limited to this, and may be applied to a membrane having a curved surface shape or a hollow fiber shape having a gel layer containing carriers on the inner side surface or the outer side surface of a cylindrical porous membrane. Likewise, the present invention does not depend on the arrangement of the treatment chambers in respective treatment portions, and a configuration in which a plurality of coaxial cylindrical treatment chambers are separated by a $CO_2$ facilitated transport membrane or a permeable membrane and a configuration in which treatment chambers are arranged in series in the extending direction of a center axis can be considered.

<2> In the above embodiment, a gel membrane made of a polyvinyl alcohol-polyacrylic acid salt copolymer is used as a material of the $CO_2$ facilitated transport membrane. However, this is only an example, and a similar hydrophilic polymer that exerts $CO_2$ selective separation performance can be adopted. Also, the $CO_2$ carrier is not limited to the materials mentioned in the embodiment, and other material membranes may be adopted as long as the material membranes have desired $CO_2$ selective permeation performance.

<3> Although water vapor is used as the sweep gas in the above embodiment, the sweep gas flowing into the treatment chamber 12 of the separation portion 14, the treatment chamber 32 of the separation portion 34, or the treatment chamber 37 of the separation portion 35 is not limited to water vapor. For example, the sweep gas may contain gas components such as nitrogen gas and argon gas. However, since the gas component is contained in the second separation gas, when considering reuse of the carbon dioxide gas in the second separation gas, an additional step of separating the gas component is required. Further, although it is possible to use a mixture gas containing a gas component other than water vapor as the sweep gas to be supplied to the treatment chamber 32 in the combustion system 5 shown in FIG. 5, since this gas component is mixed with the biogas and supplied to the treatment chamber 11 in circulation, a step of removing the gas component is required at a stage before the combustion portion 15.

In this respect, the sweep gas flowing into the treatment chambers 12, 32 (FIG. 4), and 37 is preferably a gas that can be easily separated from the carbon dioxide gas, and a water vapor gas is preferred considering reuse of the carbon dioxide gas in the second separation gas. Similarly, the sweep gas flowing into the treatment chamber 32 of FIG. 5 is preferably a gas that can be easily separated from methane gas and carbon dioxide gas, and a water vapor gas is preferable. It is also possible to mix a water vapor gas with a part of the second separation gas in the treatment chambers 12 and 37, a part of the permeated gas in the treatment chamber 32, or a part of the exhaust gas after the combustion of methane, and to reuse the mixture gas as the sweep gas. However, since the mixture gas contains carbon dioxide, it is necessary to adjust the mixing ratio of the water vapor gas such that the partial pressure of carbon dioxide in the sweep gas is lower than the partial pressure of carbon dioxide in the treatment target gas.

<4> In addition, although the combustion systems 1 to 6 respectively shown in FIGS. 1 to 6 are mentioned as examples of the configuration of the combustion system in the embodiment described above, the present invention is not limited to these specific configurations, and one skilled in the art can easily configure a different combustion system by appropriately combining part or all of the configurations of the combustion systems 1 to 6 within a range that is not contradictory as a whole. It can be said that such configurations that is suggested by the combustion systems 1 to 6 are also disclosed in this specification.

INDUSTRIAL APPLICABILITY

The present invention can be applied to a combustion system that uses, as a fuel, a mixture gas including carbon dioxide gas in combustible gas such as a biogas obtained by methane fermentation of organic matter, and by supplying the mixture gas from which carbon dioxide has been removed by a separation membrane to the combustion chamber, the present invention can be used as a combustion system that maximizes the environmental merit of using a biogas, saves energy, and obtains a stable output.

DESCRIPTION OF SYMBOLS

- 1-6 combustion system
- 14 separation portion
- 11 first treatment chamber
- 12 second treatment chamber
- 13 separation membrane
- 15 combustion portion
- 16 water vapor removing portion
- 17 water vapor supply portion
- 18 water vapor separation portion
- 19 exhaust gas supply portion
- 21-26 gas flow path
- 34, 35 separation portion
- 31, 32, 36-38 treatment chamber
- 33 separation membrane

The invention claimed is:

1. A method for operating a combustion system comprising:
   removing carbon dioxide from a treatment target gas containing a mixture gas containing methane as a main component and containing carbon dioxide, to obtain methane gas of an improved purity in which at least a content of carbon dioxide has been reduced; and
   combusting the methane gas,
   wherein removing the carbon dioxide includes supplying the treatment target gas to a combination of a first treatment chamber and a second treatment chamber separated from each other by a separation membrane therebetween;
   the separation membrane selectively allowing the carbon dioxide in the treatment target gas supplied to the first treatment chamber to pass therethrough to the second treatment chamber to obtain a first separation gas having a higher methane purity than the treatment target gas in the first treatment chamber and a second separation gas containing carbon dioxide from the treatment target gas in the second treatment chamber;
   wherein the separation membrane is a facilitated transport membrane to which a carrier that selectively reacts with carbon dioxide is added; and
   supplying water vapor to the first treatment chamber so that a relative humidity of the treatment target gas is within a range of 40% to 100%,
   controlling a temperature of the treatment target gas within a range of 80° C. to 120° C.

2. The method for operating a combustion system according to claim 1, including generating the water vapor by heating water by heat exchange with a high-temperature exhaust gas generated by a combustion of methane gas.

3. The method for operating a combustion system according to claim 1, wherein the water vapor comprises water vapor contained in an exhaust gas generated by the combustion of methane gas from the first treatment chamber.

4. The method for operating a combustion system according to claim 1, further comprising producing the treatment target gas by mixing the mixture gas with at least part of an exhaust gas containing carbon dioxide and water vapor generated by the combustion of methane gas from the first treatment chamber.

5. The method for operating a combustion system according to claim 1, further comprising removing water vapor from the first separation gas and supplying the first separation gas from which water vapor has been removed as the methane gas for combustion.

6. The method for operating a combustion system according to claim 5, including supplying the water vapor removed from the first separation gas to the first treatment chamber.

7. The method for operating a combustion system according to claim 1, further supplying a sweep gas to the second treatment chamber.

8. The method for operating a combustion system according to claim 7, including supplying water vapor to the second treatment chamber as the sweep gas or a part of the sweep gas.

9. The method for operating a combustion system according to claim 7, including supplying water vapor removed from the first separation gas to the second treatment chamber.

10. The method for operating a combustion system according to claim 7, including supplying, to the second treatment chamber, water vapor generated by heating water by heat exchange with a high-temperature exhaust gas generated by combustion of the methane gas.

11. The method for operating a combustion system according to claim 7, including supplying water vapor contained in an exhaust gas generated by the combustion of the methane gas to the second treatment chamber.

12. The method for operating a combustion system according to claim 1, wherein the mixture gas contains a gas derived from a biogas generated by methane fermentation of organic matter.

13. The method for operating a combustion system according to claim 12, further comprising using a super desulfurization catalyst to remove a sulfur component contained in the gas derived from the biogas.

* * * * *